US012542873B2

(12) United States Patent
Condon (10) Patent No.: US 12,542,873 B2
(45) Date of Patent: Feb. 3, 2026

(54) SYSTEMS AND METHODS FOR AUTOMATIC AVATAR ANIMATION FOR VIDEO CALLS

(71) Applicant: DISH Network L.L.C., Englewood, CO (US)

(72) Inventor: Caroline Condon, Denver, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 191 days.

(21) Appl. No.: 18/523,717

(22) Filed: Nov. 29, 2023

(65) Prior Publication Data

US 2025/0175577 A1  May 29, 2025

(51) Int. Cl.
*H04N 7/15* (2006.01)
*G06T 13/40* (2011.01)
*G06V 40/16* (2022.01)

(52) U.S. Cl.
CPC ............ *H04N 7/157* (2013.01); *G06T 13/40* (2013.01); *G06V 40/161* (2022.01); *G06V 40/174* (2022.01); *H04N 7/152* (2013.01); *G06V 2201/07* (2022.01)

(58) Field of Classification Search
CPC ........ H04N 7/157; H04N 7/152; H04N 7/147; G06T 13/40; G06V 40/161; G06V 40/174; G06V 2201/07
See application file for complete search history.

(56) References Cited

U.S. PATENT DOCUMENTS

| | | | | |
|---|---|---|---|---|
| 2016/0323541 | A1* | 11/2016 | Nilsson | G06V 40/171 |
| 2022/0141422 | A1* | 5/2022 | Bathiche | G06T 7/246 |
| | | | | 345/633 |
| 2022/0400228 | A1* | 12/2022 | Sommerlade | H04N 7/144 |
| 2023/0096088 | A1* | 3/2023 | Duan | H04N 9/3194 |
| | | | | 345/156 |
| 2023/0177884 | A1* | 6/2023 | Locker | G06V 40/18 |
| | | | | 382/103 |
| 2024/0121358 | A1* | 4/2024 | Wang | G06T 7/20 |

OTHER PUBLICATIONS

Delgado, "NVIDIA Broadcast 1.4 Adds Eye Contact and Vignette Effects With Virtual Background Enhancements," GeForce, Jan. 12, 2023, 5 pages.

* cited by examiner

*Primary Examiner* — Stella L. Woo
(74) *Attorney, Agent, or Firm* — Seed Intellectual Property Law Group LLP (57) ABSTRACT

An avatar animation system is provided herein. The avatar animation system receives first video data of a user that includes a depiction of a face of the user. The avatar animation system generates a model of the user based on the first video data. The avatar animation system receives an indication that the user is participating in a video conference call via a computing device and receives second video data of the user associated with the video conference call. The avatar animation system identifies one or more video alteration triggers based on one or more of the second video data, the video conference call, or the computing device. The avatar animation system determines that the second video data is to be altered based on the identified video alteration triggers and alters the depiction of the user before the second video data is received by other computing devices associated with the conference call.

19 Claims, 5 Drawing Sheets

SYSTEMS AND METHODS FOR AUTOMATIC AVATAR ANIMATION FOR VIDEO CALLS

BACKGROUND

Participants in a video conference call are often unable to determine whether other participants are engaged in the video conference call, such as when a participant chooses not to display video, when a participant is not looking at the web camera, when a participant is performing other tasks during the video conference call, and other signs of non-engagement in the video conference call. It is with respect to this and other considerations that the embodiments described herein have been made.

BRIEF SUMMARY

The embodiments disclosed herein improve the technology of video conference calls by providing a technical solution that generates a model of a user and alters video data based on the model of the user to make the user appear to be engaged in the video conference call. The embodiments disclosed herein may identify one or more video alteration triggers to determine whether alteration of the video data is necessary. The embodiments disclosed herein area also able to use video data of a user from a previous video conference call to generate the model of the user.

In some embodiments, an avatar animation system receives first video data of a user that includes a depiction of the face of the user. The avatar animation system may generate a model of the user based on the first video data. The avatar animation system may receive an indication that the user is participating in a video conference call via a computing device. The avatar animation system may receive second video data of the user captured by a camera accessible to the computing device, the second video data including a depiction of the face of the user and being associated with the video conference call. The avatar animation system may identify one or more video alteration triggers based on one or more of the second video data, the video conference call, or the computing device. The avatar animation system may determine that the second video data is to be altered to change the depiction of the face of the user within the second video data based on the identified one or more video alteration triggers. Based on a determination that the second video data is to be altered, the avatar animation system may identify the user within the second video data and alter the second video data based on the generated model to change the depiction of the face of the user within the second video data before the second video data is transmitted from the computing device to one or more other computing devices associated with the video conference call.

In some embodiments, to identify the one or more video alteration triggers, the avatar animation system identifies a portion of the second video data that depicts the user and compares the portion of the second video data with a portion of the first video data that depicts the user. The avatar animation system may determine a measure of the difference between the portion of the second video data and the portion of the first video data based on the comparison. Based on a determination that the measure of the difference exceeds a threshold value, the avatar animation system may identify the measure of the difference as a video alteration trigger.

In some embodiments, the video alteration triggers comprise one or more of: an indication that the user is interacting with an application on the computing device, an indication that the user has not spoken for a selected amount of time, an indication that the user has requested that the second video data be altered, an indication that a tone of the voice of the user has changed, an indication that a selected topic is being discussed during the video conference call, an indication that the facial expression of the user has changed, an indication of the number of participants participating in the video conference call, or an indication of prior usage of the generated model to alter video data for the user during the video conference call.

In some embodiments, the avatar animation system identifies one or more video alteration cessation triggers based on one or more of the second video data, the video conference call, or the computing device. The avatar animation system may determine that alteration of the second video data is to cease based on the identified one or more video alteration cessation triggers. The avatar animation system may cease alteration of the second video data in response to determining that the alteration of the second video data is to be ceased.

In some embodiments, the one or more video alteration cessation triggers include one or more of: an indication that a user has unmuted a microphone, an indication that one or more users of the video conference call has referred to the user, an indication that one or more other users of the video conference call has mentioned a topic associated with the user, an indication that background noise detected in the second video data has changed, or an indication that the user has returned to the video conference call from another process running on the computing device.

In some embodiments, to generate the model of the user based on the first video data, the avatar animation system identifies one or more facial expressions of the user that are depicted in the first video data. The avatar animation system may, for each respective facial expression of the one or more facial expressions: determine whether the respective facial expression is facial expression made by the user when the user is engaged in the video conference call based on the first video data; generate an image of the respective facial expression based on the first video data based on a determination that the respective facial expression is a facial expression made by the user when the user is engaged in a video conference call; and adding the image of the respective facial expression to a training dataset. The avatar animation system may train a machine learning model to generate an image of a facial expression of the user based on the training dataset.

In some embodiments, to alter the second video data based on the generated model, the avatar animation system identifies a face of the user based on the second video data and generates a facial expression of the user via the machine learning model. The avatar animation system may alter the depiction of the face of the user included in the second video data based on the generated facial expression.

In some embodiments, to alter the depiction of the face of the user based on the generated facial expression, the avatar animation system alters a direction of the depiction of the face of the user such that the user appears to be facing the camera and alters the depiction of the face of the user such that the user appears to be moving.

In some embodiments, to alter the depiction of the face of the user based on the generated facial expression, the avatar animation system gradually alters the depiction of the face of the user based on the generated facial expression. The avatar animation system may alter a first portion of the depiction of the face of the user based on the generated facial expression, generate a second facial expression via the machine learning model, and alter a second portion of the depiction of the face of the user that is greater than the first portion based on the second facial expression.

In some embodiments, the avatar animation system generates one or more facial expressions of the user via the machine learning model before the video conference call begins.

DETAILED DESCRIPTION

Video conference calls are increasingly being used by many different organizations. Participants of such calls, however, are not always able to be engaged in these calls, such as due to not feeling well, not wanting to participate in or be engaged in the call, performing other tasks during the conference call, etc. Typically, users turn off their camera when they are not engaged in video conference calls, and other participants may feel that they are the only participants who are engaged in the video conference call.

The embodiments disclosed herein address the issues above and thus improve the technology of video conference calls by providing a technical solution that generates a model of a user and alters video data based on the model of the user to make the user appear to be engaged in the video conference call. The embodiments disclosed herein may identify one or more video alteration triggers to determine whether alteration of the video data is necessary. The embodiments disclosed herein area also able to use video data of a user from a previous video conference call to generate the model of the user.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed to include "and/or" unless the content clearly dictates otherwise. The term "and/or" is generally employed to include an inclusive or.

The headings and Abstract of the Disclosure provided herein are for convenience only and do not interpret the scope or meaning of the embodiments.

Figure 1:
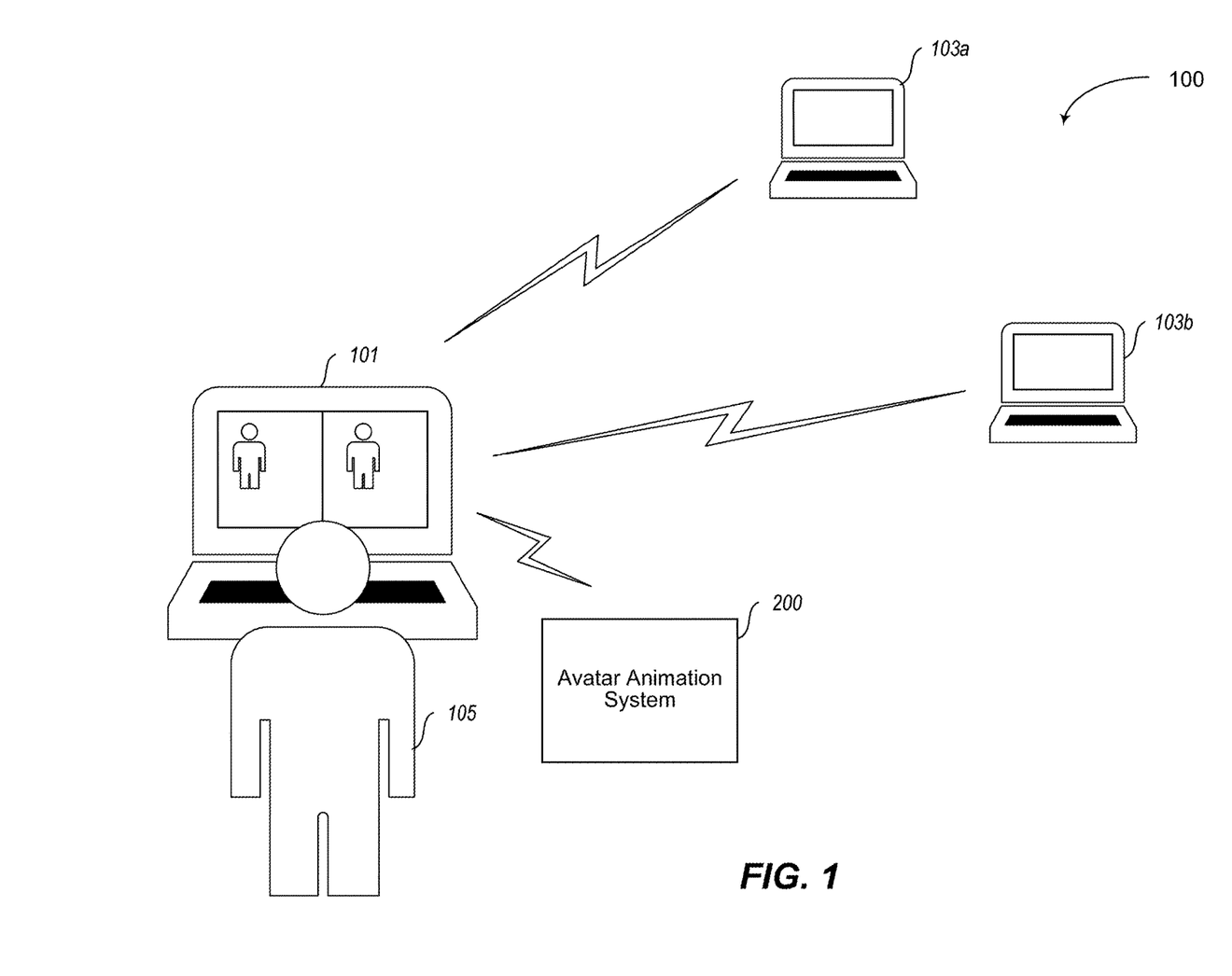
FIG. 1 is a display diagram depicting a sample environment in which an avatar animation system operates, according to various embodiments described herein.

FIG. 1 is a display diagram depicting a sample environment 100 in which an avatar animation system 200 operates, according to various embodiments described herein. The environment 100 includes a user computing device 101, one or more other computing devices 103a and 103b (collectively "other computing devices 103"), a user 105, and an avatar animation system 200. The environment 100 is one instance of an environment in which the avatar animation system 200 may operate, and the avatar animation system 200 may operate in other environments. Moreover, the avatar animation system 200 may be included in one or more of the computing devices described in FIG. 1 or in other computing devices, computing systems, servers, etc. not illustrated in FIG. 1. Furthermore, one or more of the functions of the avatar animation system 200 may be performed by one or more of the computing devices described in FIG. 1 or in other computing devices, computing systems, servers, etc. not illustrated in FIG. 1.

The avatar animation system 200 alters video data of the user 105 that is captured by the user computing device 101 before the video data is transmitted to the other computing devices 103 in connection with a video conference call. In some embodiments, the avatar animation system 200 alters the video data of the user 105 to make it appear that the user 105 is engaged in the video conference call. In some embodiments, the avatar animation system 200 commences alteration of the video data based on the detection of a video alteration trigger. In some embodiments, the avatar animation system 200 ceases alteration of the video based on the detection of a video alteration cessation trigger. The avatar animation system 200 is discussed further below in connection with FIG. 2.

The user computing device 101 and other computing devices 103 may be PCs, tablet computing devices, laptop computers, smartphones, personal assistants, drones, or other devices that may be used by a user to participate in a video conference call. The user computing device 101, other computing devices 103, and avatar animation system 200, may be communicatively coupled to a network or to each other so that the computing devices are able to communicate with each other. At least the user computing device 101 may be communicatively coupled to an avatar animation system 200.

The user 105 is a user of the user computing device 101. The user 105 may use the user computing device 101 to participate in a video conference call, to perform other tasks, to submit data to the avatar animation system 200, etc.

The network (not illustrated) within which the user computing device 101, computing devices 103, and avatar animation system 200 operate may be a network, communication system, or networked system (not shown) to which the user computing device 101, other computing devices 103, and avatar animation system 200 may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like.

Figure 2:
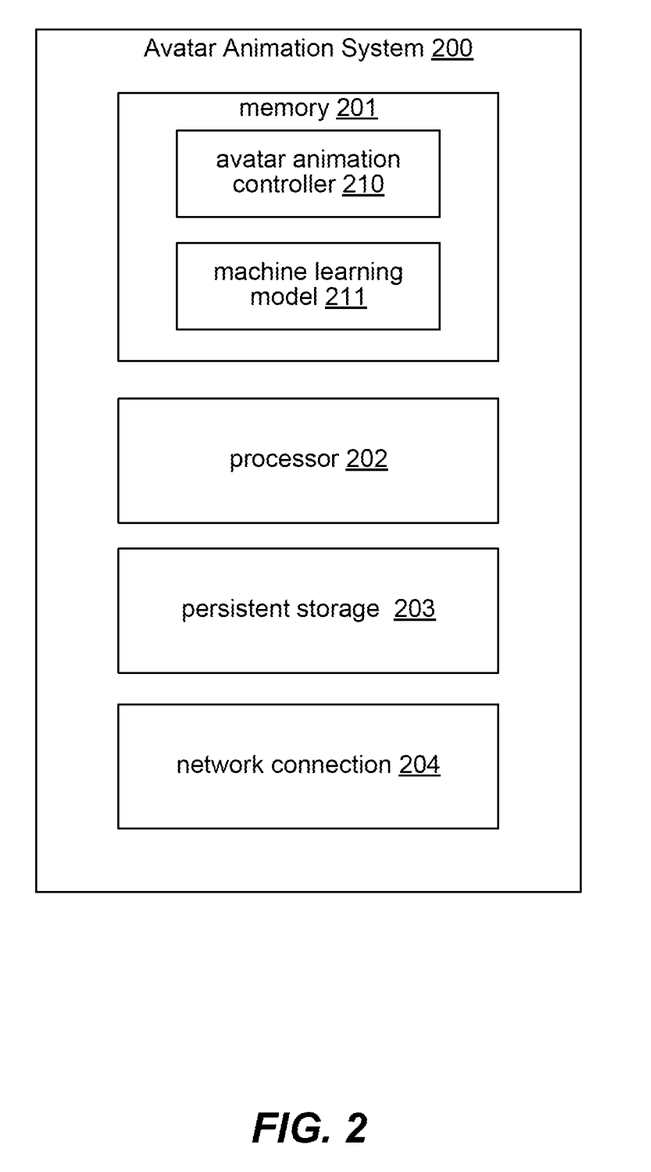
FIG. 2 is a block diagram depicting example computer components incorporated in an avatar animation system, according to various embodiments described herein.

FIG. 2 is a block diagram depicting example computer components incorporated in an avatar animation system 200, according to various embodiments described herein. All or a portion of the avatar animation system 200 may be: located on or within a computing device or server that is used to host a video conference call, located on or within a computing device used by one or more participants of the video conference call, located on or within a computing device that is not hosting the video conference call or being used by a participant of the video conference call to participate in the video conference call, or located in any other devices in which the avatar animation system 200 is able to perform at least some of its functions.

In various embodiments, the avatar animation system 200 includes one or more of the following: a computer memory 201, a central processing unit 202, a persistent storage device 203, and a network connection 204. The memory 201 may be used for storing programs and data while they are being used, including data associated with: video conference calls; the user; models of the user, such as machine learning models, artificial intelligence models, three-dimensional models, two-dimensional models, or other types of models of a user; and triggers for altering or ceasing alteration of video data. The processor 202 may be used for executing computer programs (not shown), such as computer programs which perform some or all of the functions of the avatar animation system. In some embodiments, the processor 202 may be one or more processors, microcontrollers, or other computer components used for executing computer instructions. In some embodiments, any of the processors, microcontrollers, or other computer components, either alone or in combination, can perform any of the functions or acts described herein. The persistent storage device 203 may be a hard drive or flash drive for persistently storing programs and data. The network connection 204 may be used for connecting to one or more radio base stations or other computer systems (not shown), to send or receive data, such as via the Internet or another network and associated networking hardware, such as switches, routers, repeaters, electrical cables and optical fibers, light emitters and receivers, radio transmitters and receivers, and the like, and to access video data associated with a video conference call, and for connecting to one or more computer devices associated with a video conference call or other computer systems. In various embodiments, the avatar animation system 200 additionally includes input and output devices, such as a keyboard, a mouse, display devices, etc.

While an avatar animation system 200 configured as described may be used in some embodiments, in various other embodiments, the avatar animation system 200 may be implemented using devices of various types and configurations, and having various components. The memory 201 may include an avatar animation controller 210, which contains computer-executable instructions that, when executed by the processor 202, cause the avatar animation system 200 to perform the operations and functions described herein. For example, the programs referenced above, which may be stored in computer memory 201, may include or be comprised of such computer-executable instructions. The memory 201 may also include a machine learning model 211 which is used to generate images of one or more aspects of a user, such as facial expressions.

Figure 3A:
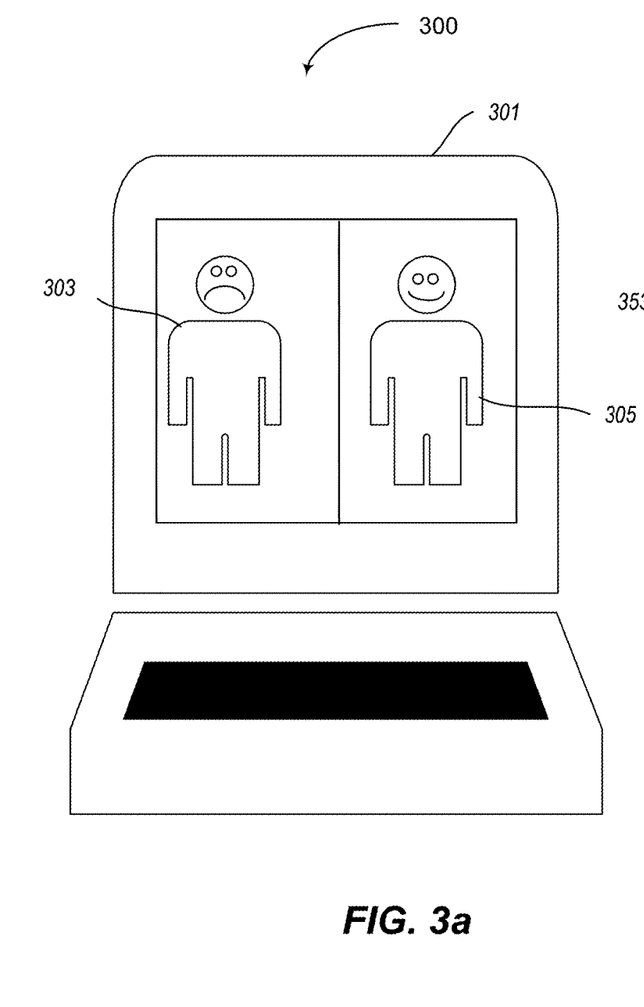
FIG. 3a is a first diagram of a video conference call before the avatar animation system alters the depiction of a participant in the video conference call, according to various embodiments described herein.
Figure 3B:
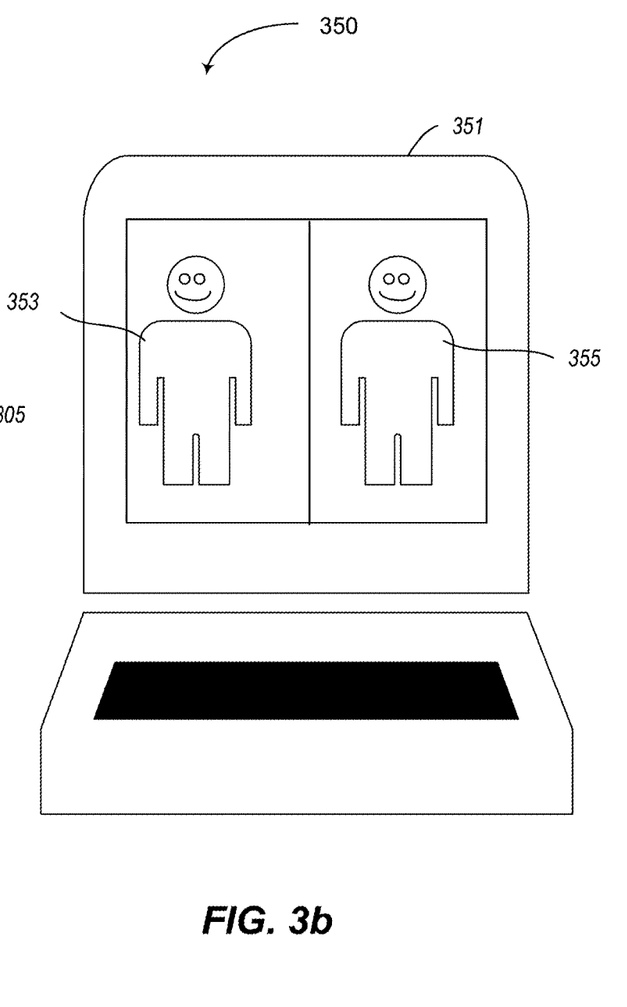
FIG. 3b is a second diagram of a video conference call after the avatar animation system alters the depiction of a participant in the video conference call, according to various embodiments described herein.
Figure 4:
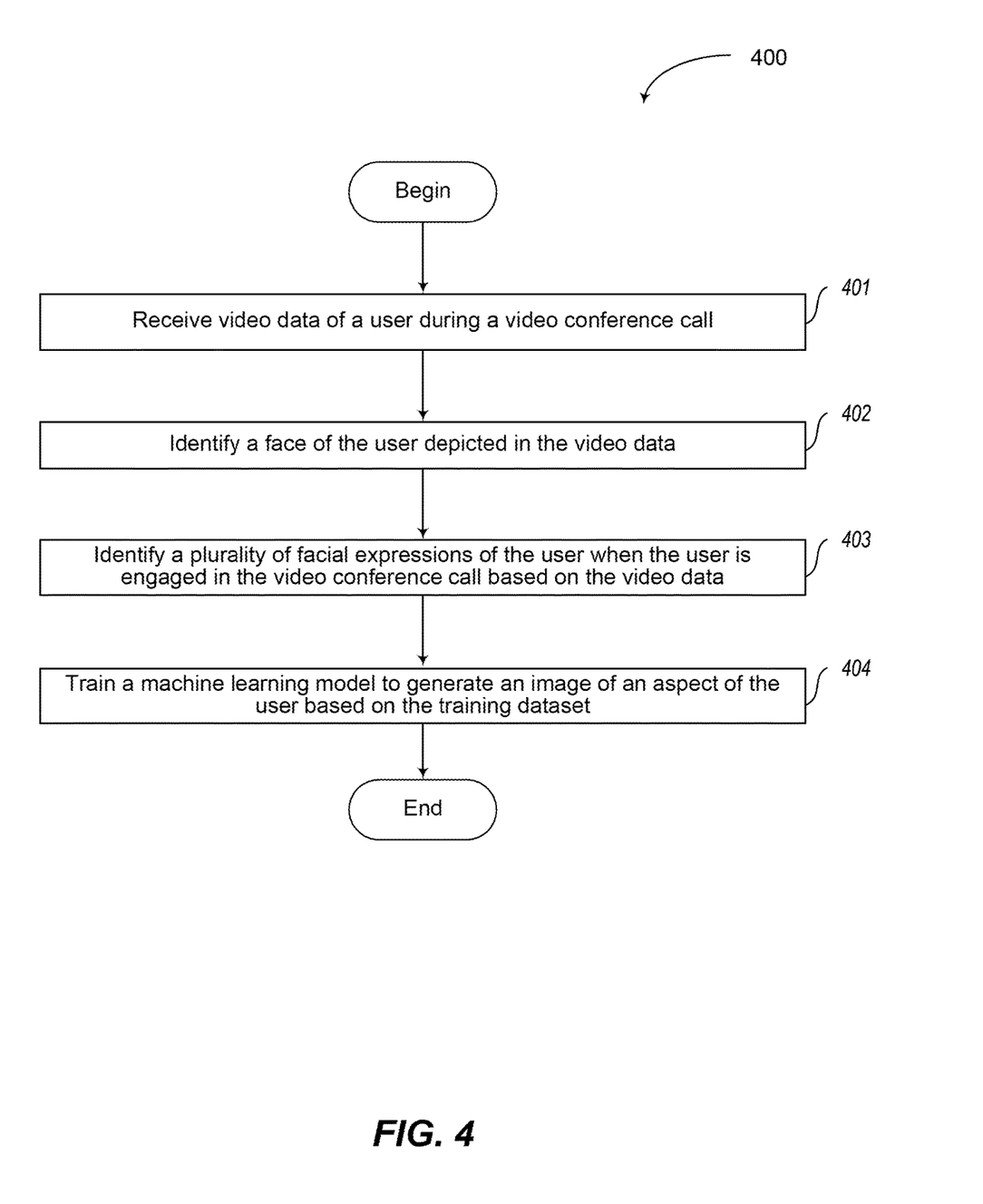
FIG. 4 is a flow diagram of a process used to generate a model of a user according to various embodiments described herein.
Figure 5:
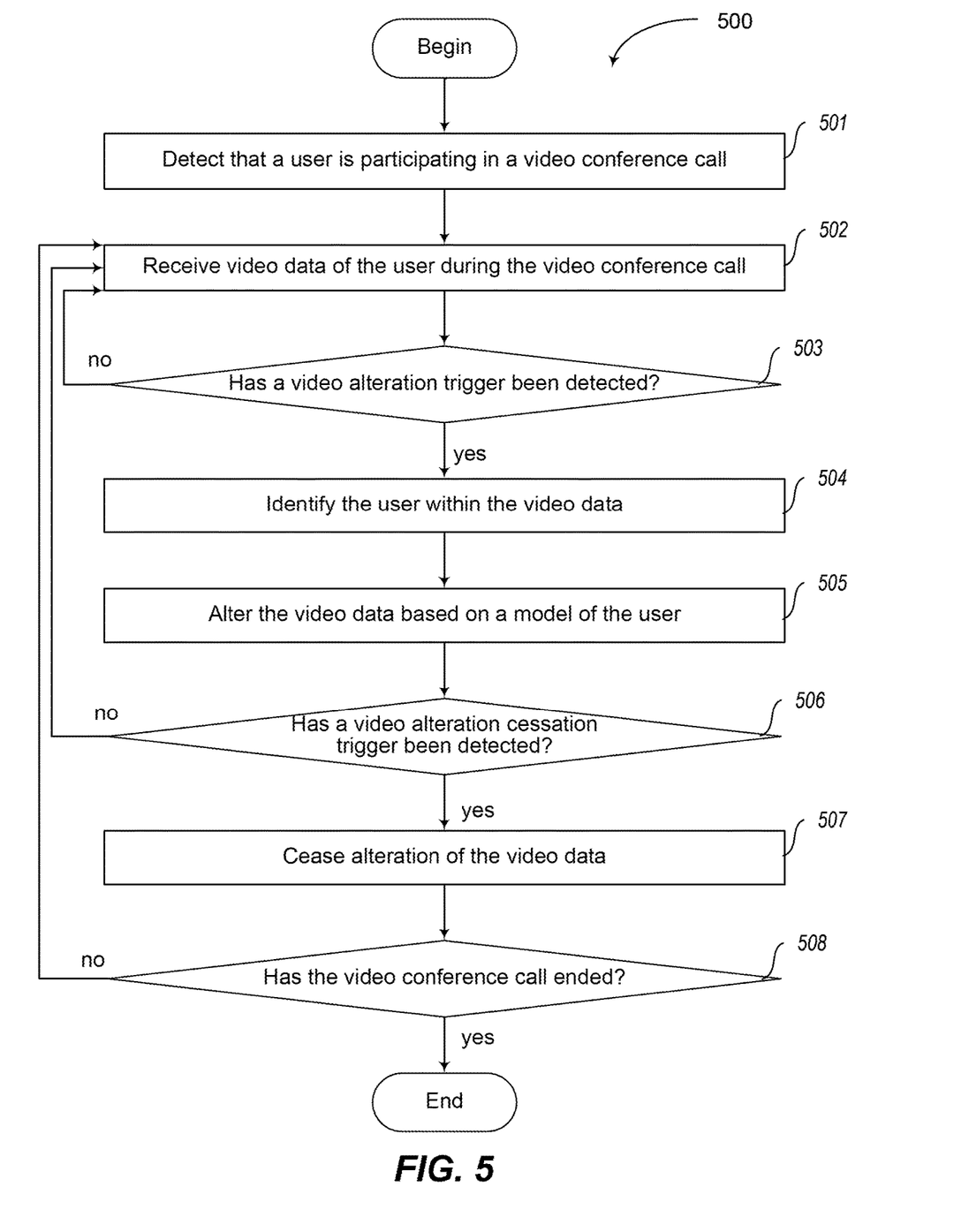
FIG. 5 is a flow diagram of a process used to alter video data depicting a user during a video conference call according to various embodiments described herein.

The avatar animation controller 210 performs the core functions of the avatar animation system 200, as discussed herein and also with respect to FIGS. 3-5. In particular, the avatar animation controller 210 alters the depiction of a participant of a video conference call based on a model of the participant. Additionally, the avatar animation controller 210 generates the model of the participant based on past video data of the participant. The avatar animation controller 210 may also perform other functions related to altering a depiction of a participant during a video conference call as described herein.

In an example embodiment, the avatar animation controller 210 or computer-executable instructions stored on memory 201 of the avatar animation system 200 are implemented using standard programming techniques. For example, the avatar animation controller 210 or computer-executable instructions stored on memory 201 of the avatar animation system 200 may be implemented as a "native" executable running on processor 202, along with one or more static or dynamic libraries. In other embodiments, the avatar animation controller 210 or computer-executable instructions stored on memory 201 of the avatar animation system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single processor computer system, or alternatively decomposed using a variety of structuring techniques known in the art, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented or performed by each component/module, and in different orders, and by different components/modules, yet still achieve the functions of the avatar animation controller 200.

In addition, programming interfaces to the data stored as part of the avatar animation controller 210 can be available by standard mechanisms such as through C, C++, C#, Java, and web APIs; libraries for accessing files, databases, or other data repositories; through scripting languages such as JavaScript and VBScript; or through Web servers, FTP servers, or other types of servers providing access to stored data. The avatar animation controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the avatar animation controller 200.

Furthermore, in some embodiments, some or all of the components/portions of the avatar animation controller 210, or functionality provided by the computer-executable instructions stored on memory 201 of the avatar animation system 200 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system components or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the computing devices, avatar animation system, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The operation of certain aspects will now be described with respect to FIGS. 3-5. In at least one of various embodiments, processes 400 and 500 described in conjunction with FIGS. 4 and 5, respectively, may be implemented by one or more processors or executed via circuitry on one or more computing devices, such as the avatar animation system 200 described in connection with FIG. 2, a computing device, such as the user computing device 101 and other computing devices 103 described in connection with FIG. 1, or other computing devices.

FIG. 3a is a first diagram 300 of a video conference call before the avatar animation system alters the depiction of a participant in the video conference call, according to various embodiments described herein. The diagram 300 includes a screen 301, a first participant 303, and a second participant 305. The screen 301 may be a screen of a user computing device, such as the user computing device 101 described above in connection with FIG. 1. The screen 301 displays a video conference call that includes the first participant 303 and second participant 305. The first participant 303 is a user of the screen 301. As can be seen in the diagram 300, the first participant 303 is not engaged in the video conference call, while the second participant 305 is engaged in the video conference call.

FIG. 3b is a second diagram 350 of a video conference call after the avatar animation system alters the depiction of a participant in the video conference call, according to various embodiments described herein. The diagram 350 includes a screen 351, a first participant 353, and a second participant 355. The screen 351 displays a video conference call that includes the first participant 353 and second participant 355. By employing embodiments described herein, the first participant 303 in the first diagram 301 is identified as being not engaged in the video conference call and a model of the first participant 303 is generated. That model is then modified resulting in the first participant 353 appearing to be engaged in the video conference call, as can be seen in the diagram 350. As such, the avatar animation system 200 has altered the depiction of the first participant 303 in the first diagram 300 such that the first participant 353 in the second diagram 350 appears to be engaged in the video conference call.

FIG. 4 is a flow diagram of a process 400 used to generate a model of a user according to various embodiments described herein. The process 400 may be performed by an avatar animation system, such as the avatar animation system 200 described above in connection with FIG. 2. The process 400 begins, after a start block, at act 401 where the avatar animation system receives video data of a user during a video conference call. In some embodiments, the avatar animation system receives the video data via user input. In some embodiments, the avatar animation system prompts the user to submit video data of a video conference call in which the user was engaged for at least the majority of the video conference call. In some embodiments, the avatar animation system prompts the user to identify points in the video data during which the user is engaged in the video conference call.

The process 400 proceeds to act 402, where the avatar animation system identifies a face of the user depicted in the video data. In some embodiments, the avatar animation system identifies the face of the user via one or more image recognition techniques. For example, the avatar animation system may use an image recognition algorithm to identify the eyes of the user, and then use the identification of the eyes of the user to identify the remainder of the user's face. In some embodiments, the avatar animation system identifies other or additional aspects of the user's appearance, such as the user's clothes, the user's mannerisms, or other aspects of a user's appearance. In some embodiments, the avatar animation system performs act 402 by converting one or more frames included in video data to one or more images and using known image recognition techniques to identify the face of the user. For example, the avatar animation system may preprocess the images by converting aspects of the images into numerical values and compare the generated numerical values to those created from other images in a training dataset and classifying the aspects of the images based on the comparison. By doing so, the avatar animation system may recognize clothing items, features of a face of a person, inanimate objects, etc.

The process 400 proceeds to act 403, where the avatar animation system identifies a plurality of facial expressions of the user when the user is engaged in the video conference call based on the video data. In some embodiments, the input indicating the video data includes an indication of one or more points in the video data at which the user is engaged in the video conference call. In some embodiments, the avatar animation system may identify one or more aspects of a face in one or more images generated from the video data and determine whether the aspects of the face have changed in other images generated from the video data. For example, the avatar animation system may compare the aspects of the face from an image generated at a first point in the video data to aspects of the face from an image generated at a second point in the video data that occur at a later time, e.g. ten milliseconds later, one second later, five seconds later, one minute later, etc. In some embodiments, when performing act 403, the avatar animation system identifies one or more particular features of the face of the user and performs act 403 only on portions of images that include those particular features instead of on the entire image. For example, the avatar animation system may identify portions of the image that include the eyes and mouth and perform act 403 with respect to those portions. By doing so, the avatar animation system is able to reduce the number of processing cycles needed to identify facial expressions of the user. In some embodiments, the avatar animation system uses training data generated from video data depicting the user to identify portions of the user's face that are more likely to change when the user is engaged in a videoconference and performs act 403 with respect to those portions of the user's face.

The process 400 proceeds to act 404, where the avatar animation system trains a machine learning model to generate an image of an aspect of the user based on the training dataset. The aspect of the user may be a part of the user's face, a facial expression of the user, a direction that the user was facing, or other aspects of the user.

After act 404, the process 400 ends.

FIG. 5 is a flow diagram of a process 500 used to alter video data depicting a user during a video conference call according to various embodiments described herein. The process 500 may be performed by an avatar animation system, such as the avatar animation system 200 described above in connection with FIG. 2. First, at act 501, the avatar animation system detects that a user is participating in a video conference call.

The process 500 proceeds to act 502, where the avatar animation system receives video data of the user during the video conference call. In some embodiments, the video data is live video data of the user during the video conference call.

The process 500 proceeds to act 503, where the avatar animation system determines whether a video alteration trigger has been detected. If a video alteration trigger has been detected, the process 500 proceeds to act 504, otherwise the process returns to act 502. In some embodiments, a video alteration trigger includes one or more of: an indication that the user is interacting with an application on the computing device that is used by the user to participate in the video conference call; an indication that the user has not spoken for a selected amount of time; an indication that the user has requested that the video data be altered; an indication that a tone of the voice of the user has changed; an indication that a selected topic is being discussed during the video conference call; an indication that the facial expression of the user has changed; an indication of the number of participants participating in the video conference call; an indication of prior usage of the generated model to alter video data for the user during the conference call; a measure of the difference of the depiction of the user in the video data and the depiction of the user in the training data; or other indications that video data should be altered on behalf of the user.

In some embodiments, the avatar animation system identifies the video alteration trigger by performing an analysis on the video data, such as by using image recognition techniques to identify an aspect of the user, by using speech recognition techniques to identify one or more words spoken by participants of the video conference call, etc. For example, the avatar animation system may identify the user's face within the video data and compare the depiction of the user's face to a depiction of the user's face within the training video data used to generate the model of the user. The comparison may be used to determine a measure of the difference between the user's face in the video data and the user's face in the training video data. In this example, when the measure of the difference exceeds a threshold amount, the avatar animation system identifies the measure of the difference as a video alteration trigger.

At act 504, the avatar animation system identifies a user within the video data. In some embodiments, the avatar animation system utilizes image recognition techniques on the video data to identify the user.

The process 500 proceeds to act 505, where the avatar animation system alters the video data based on a model of the user. In some embodiments, the avatar animation system causes the altered video data to be transmitted to other computing devices associated with the video conference call. In some embodiments, the video conference call application transmits the altered video data to other computing devices associated with the video conference call. In some embodiments, the video data is altered before the video data is received by one or more other computing devices being used by other users to participate in the video conference call. In some embodiments, the video data is altered before the video data is received by the video conference call application used by the user's computing device. In an example embodiment, the avatar animation system alters the video data received by a camera associated with the user's computing device before the video data is received by the video conference call application as input. Thus, in this example embodiment, the video data that would ordinarily be received by the video conference call application is altered before the video conference call application receives the video data, and the video conference call application uses the altered video data as if it was video data received directly from a camera associated with the computing device.

In some embodiments, the model is an artificial intelligence or machine learning model that generates images of aspects of the user, such as the machine learning model trained as part of process 400 described above in connection with FIG. 4. In some embodiments, to alter the video data based on the model of the user, the avatar animation system alters the video data to include a generated image of an aspect of the user based on the identification of the user in act 504. For example, the avatar animation system may generate an image of a facial expression of the user and replace the depiction of the user's facial expression in the video data with the generated image. In another example, the avatar animation system generates an image of the user's smile and overlays the image of the user's smile on top of a depiction of the user's face in the video data. In another example, the avatar animation system generates an image of the user's face positioned such that the user appears to face a camera associated with the user's computing device and overlays the image of the user's face on top of a depiction of the user's face in the video data. In yet another example, the avatar animation system generates an image of the body and face of the user and overlays that image on top of a depiction of the user's body and face in the video data.

In some embodiments, to alter the video data based on the model of the user, the avatar animation system gradually alters the depiction of the user in the video data. For example, the avatar animation system may generate an image of an aspect of the user, and change a portion of the aspect of the user based on the generated image at a first time, and then change a greater portion of the aspect of the user based on the generated image at subsequent times until the video data is altered to include the entirety of the generated image of the aspect of the user. In some embodiments, multiple images of the aspect of the user are generated, such as generating an image of the aspect of the user at each time that the video data is altered.

In some embodiments, the avatar animation system alters the video data based on the model of the user to cause the depiction of the user to appear to be facing a video camera. In some embodiments, the avatar animation system alters the video data based on the model of the user to cause the depiction of the user to appear to be moving, such as by altering the video data based on multiple generated images of an aspect of the user.

In some embodiments, the model is used to generate one or more images of aspects of the user before the video conference call begins. In such embodiments, the avatar animation system may use the images generated before the video conference call begins at act 505.

The process 500 proceeds to act 506, where the avatar animation system determines whether a video alteration cessation trigger has been detected. If a video alteration cessation trigger has been detected, the process 500 proceeds to act 507, otherwise, the process 500 returns to act 502. In some embodiments, a video alteration cessation trigger includes one or more of: an indication that the user has unmuted a microphone; an indication that one or more other users of the video conference call has referred to the user; an indication that one or more users of the video conference call has mentioned a topic associated with the user; an indication that background noise detected in the video data has changed; an indication that the user has returned to the video conference call from another process or application running on the computing device used by the user to participate in the video conference call; an indication that a measure of the difference of an aspect of the user depicted in the video data from the aspect of the user depicted in the training video data is below a threshold amount; or other indicators that alteration of the video data should be ceased. In some embodiments, the video alteration cessation triggers are detected in a similar manner to detecting the video alteration triggers.

At act 507, the avatar animation system ceases alteration of the video data.

The process 500 proceeds to act 508, where the avatar animation system determines whether the video conference call has ended. If the video conference call has ended, the process 500 ends, otherwise, the process 500 returns to act 502.

After act 508, the process 500 ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
at least one processor; and
at least one memory coupled to the at least one processor, the memory having computer-executable instructions stored thereon that, when executed by the at least one processor, cause the system to:
receive first video data of a user, the first video data including a depiction of a face of the user;
generate a model of the user based on the first video data;
receive an indication that the user is participating in a video conference call via a computing device;
receive second video data of the user captured by a camera accessible to the computing device, the second video data including a depiction of the face of the user, the second video data being associated with the video conference call;
identify one or more video alteration triggers based on one or more of the second video data, the video conference call, or the computing device;
determine that the second video data is to be altered to change the depiction of the face of the user within the second video data based on the identified one or more video alteration triggers; and
based on a determination that the second video data is to be altered:
identify the user within the second video data; and
before the second video data is transmitted from the computing device to one or more other computing devices that are associated with the video conference call, gradually alter the second video data based on the generated model to change the depiction of the face of the user within the second video data based on a plurality of generated facial expressions of the user.

2. The system of claim 1, wherein, to identify the one or more video alteration triggers, the computer-executable instructions, when executed by the at least one processor, cause the system to:
identify a portion of the second video data that depicts the user;
compare the portion of the second video data with a portion of the first video data that depicts the user;
determine, based on the comparison, a measure of the difference between the portion of the second video data and the portion of the first video data; and
based on a determination that the measure of the difference exceeds a threshold value, identify the measure of the difference as a video alteration trigger.

3. The system of claim 1, wherein the one or more video alteration triggers comprise one or more of:
an indication that the user is interacting with an application on the computing device;
an indication that the user has not spoken for a selected amount of time;
an indication that the user has requested that the second video data be altered;
an indication that a tone of the voice of the user has changed;
an indication that a selected topic is being discussed during the video conference call;
an indication that the facial expression of the user has changed;
an indication of the number of participants participating in the video conference call; or an indication of prior usage of the generated model to alter video data for the user during the video conference call.

4. The system of claim 1, wherein the computer-executable instructions, when executed by the at least one processor, further cause the system to:
   identify one or more video alteration cessation triggers based on one or more of the second video data, the video conference call, or the computing device;
   determine that alteration of the second video data is to cease based on the identified one or more video alteration cessation triggers; and
   in response to determining that the alteration of the second video data is to be ceased, cease the alteration of the second video data.

5. The system of claim 4, wherein the one or more video alteration cessation triggers comprise one or more of:
   an indication that the user has unmuted a microphone;
   an indication that one or more other users of the video conference call has referred to the user;
   an indication that one or more other users of the video conference call has mentioned a topic associated with the user;
   an indication that background noise detected in the second video data has changed; or
   an indication that the user has returned to the video conference call from another process running on the computing device.

6. The system of claim 1, wherein, the model of the user is a machine learning model that generates an image of a facial expression of the user, and wherein to generate the model of the user based on the first video data, the computer-executable instructions, when executed by the at least one processor, cause the system to:
   identify one or more facial expressions of the user that are depicted in the first video data;
   for each respective facial expression of the one or more facial expressions:
      determine whether the respective facial expression is a facial expression made by the user when the user is engaged in the video conference call based on the first video data;
      based on a determination that the respective facial expression is a facial expression made by the user when the user is engaged in a video conference call, generating an image of the respective facial expression based on the first video data; and
      adding the image of the respective facial expression to a training dataset; and
   training the machine learning model to generate an image of a facial expression of the user based on the training dataset.

7. The system of claim 6, wherein, to alter the second video data based on the generated model, the computer-executable instructions, when executed by the at least one processor, cause the system to:
   identify a face of the user based on the second video data;
   generate, via the machine learning model, a facial expression of the user; and
   alter the depiction of the face of the user included in the second video data based on the generated facial expression.

8. The system of claim 7, wherein, to alter the depiction of the face of the user based on the generated facial expression, the computer-executable instructions, when executed by the at least one processor, cause the system to:
   alter a direction of the depiction of the face of the user such that the user appears to be facing the camera; and
   alter the depiction of the face of the user such that the user appears to be moving.

9. The system of claim 7, wherein, to alter the depiction of the face of the user based on the generated facial expression, the computer-executable instructions, when executed by the at least one processor, cause the system to:
   gradually alter the depiction of the face of the user based on the generated facial expression by:
      altering a first portion of the depiction of the face of the user based on the generated facial expression;
      generating a second facial expression via the machine learning model; and
      altering a second portion of the depiction of the face of the user that is greater than the first portion of the depiction of the face of the user based on the second facial expression.

10. The system of claim 7, wherein the computer-executable instructions, when executed by the at least one processor, further cause the system to:
    generate one or more facial expressions of the user via the machine learning model before video conference call begins.

11. A method in a computing device, the method comprising:
    receiving recorded video data captured by a camera accessible to the computing device, the recorded video data indicating a user and being captured before a video conference call begins;
    receiving an indication that the user is participating in the video conference call via the computing device;
    receiving first video data captured by a camera accessible to the computing device, the first video data indicating the user;
    identifying one or more video alteration triggers based on one or more of the first video data, the video conference call, or the computing device;
    determining that the first video data is to be altered to change an appearance of the user based on the identified one or more video alteration triggers; and
    in response to determining that the first video data is to be altered:
       identifying the user within the first video data; and
       altering the first video data based on a model configured to generate one or more depictions of the user, such that the appearance of the user depicted in the first video data is changed before the first video data is transmitted from the computing device to one or more other computing devices that are associated with the video conference call, the model being generated based on the recorded video data that was captured before the video conference call began.

12. The method of claim 11, wherein identifying one or more video alteration triggers further comprises:
    receiving input indicating second video data, the second video data depicting the user during the user's participation in a prior video conference call;
    identifying a portion of the first video data that depicts the user;
    comparing the portion of the first video data with a portion of the second video data that depicts the user;
    determining, based on the comparison, a measure of the difference between the portion of the second video data and the portion of the first video data; and
    in response to a determination that the measure of the difference exceeds a threshold value, identify the measure of the difference as a video alteration trigger.

13. The method of claim 11, further comprising:
identifying one or more video alteration cessation triggers based on one or more of the first video data, the video conference call, or the computing device
determining that alteration of the first video data is to be cease based on the identified one or more video alteration cessation triggers; and
based on a determination that the alteration of the first video data is to be ceased:
ceasing the alteration of the first video data.

14. A non-transitory processor-readable storage medium that stores at least one of instructions or data, the instructions or data, when executed by at least one processor, cause the at least one processor to:
receive an indication that a user is participating in a video conference call via a computing device;
receive first video data captured by a camera accessible to the computing device, the first video data indicating the user;
identify one or more video alteration triggers based on one or more of the first video data, the video conference call, or the computing device;
determine that the first video data is to be altered to change an appearance of the user based on the identified one or more video alteration triggers; and
based on a determination that the first video data is to be altered:
detect the user within the first video data; and
gradually modify the first video data based on a model configured to generate one or more depictions of the user and a plurality of generated depictions of the user, such that the appearance of the user depicted in the first video data is changed before the first video data is transmitted from the computing device to one or more other computing devices that are associated with the video conference call.

15. The non-transitory processor-readable storage medium of claim 14, wherein, the model is a machine learning model, and wherein the at least one processor is further caused to:
receive second video data indicating a user;
identify one or more aspects of the appearance of the user depicted in the second video data;
for each respective aspect of the appearance of the user of the one or more aspects:
determine whether the respective aspect of the appearance of the user is an aspect of the user's appearance when the user is engaged in a prior video conference call based on the second video data;
based on a determination that the aspect of the appearance of the user is an aspect of the user's appearance when the user is engaged in the prior video conference call, generating an image of the aspect of the appearance of the user based on the second video data; and
adding the image of the aspect of the appearance of the user to a training dataset; and
training the machine learning model to generate an image of an aspect of the appearance of the user based on the training dataset.

16. The non-transitory processor-readable storage medium of claim 15, wherein, to modify the first video data based on the generated model, the at least one processor is further caused to:
detect a face of the user based on the first video data;
generate, via the machine learning model, an aspect of the appearance of the user; and
modify the depiction of the face of the user included in the first video data based on the generated aspect.

17. The non-transitory processor-readable storage medium of claim 16, wherein, to modify the depiction of the face of the user based on the generated aspect, the at least one processor is further caused to:
modify a direction of the depiction of the user such that the user appears to be facing the camera; and
modify the depiction of the user such that the user appears to be moving.

18. The non-transitory processor-readable storage medium of claim 16, wherein, to modify the depiction of the face of the user based on the generated aspect, the at least one processor is further caused to:
gradually modify the depiction of the face of the user based on the aspect by:
modifying a first portion of the depiction of the user based on the generated aspect;
generating a second aspect of the appearance of the user via the machine learning model; and
modifying a second portion of the depiction of the face of the user that is greater than the first depiction of the face of the user based on the second aspect.

19. The non-transitory processor-readable storage medium of claim 16, wherein the at least one processor is further caused to:
generate one or more aspects of the appearance of the user via the machine learning model before video conference call begins; and
utilize at least one aspect of the generated one or more aspects to alter the appearance of the user.

* * * * *